United States Patent
Bar-Yanai et al.

(10) Patent No.: US 9,871,875 B2
(45) Date of Patent: Jan. 16, 2018

(54) IDENTIFYING BROWSING SESSIONS BASED ON TEMPORAL TRANSACTION PATTERN

(71) Applicant: VASONA NETWORKS INC., Santa Clara, CA (US)

(72) Inventors: Roni Bar-Yanai, Even-Yehuda (IL); Evgeni Bord, Rishon Le-Zion (IL)

(73) Assignee: VASONA NETWORKS INC., San Jose, CA (US)

( * ) Notice: Subject to any disclaimer, the term of this patent is extended or adjusted under 35 U.S.C. 154(b) by 156 days.

(21) Appl. No.: 14/685,629

(22) Filed: Apr. 14, 2015

(65) Prior Publication Data

US 2016/0308986 A1 Oct. 20, 2016

(51) Int. Cl.
| | |
|---|---|
| *G06F 15/173* | (2006.01) |
| *H04L 29/08* | (2006.01) |
| *H04W 28/02* | (2009.01) |
| *H04L 29/06* | (2006.01) |
| *H04W 12/00* | (2009.01) |
| *H04L 12/841* | (2013.01) |

(52) U.S. Cl.
CPC ............. *H04L 67/22* (2013.01); *H04L 67/02* (2013.01); *H04L 67/28* (2013.01); *H04L 67/42* (2013.01); *H04W 28/0268* (2013.01); *H04L 47/28* (2013.01); *H04L 63/0281* (2013.01); *H04W 12/00* (2013.01)

(58) Field of Classification Search
CPC ......... H04L 67/22; H04L 67/02; H04L 67/28; H04L 67/42
USPC ................................................ 709/224, 203
See application file for complete search history.

(56) References Cited

U.S. PATENT DOCUMENTS

| | | | | |
|---|---|---|---|---|
| 7,454,206 B1* | 11/2008 | Phillips | ............... | H04W 76/021 370/352 |
| 8,185,457 B1* | 5/2012 | Bear | ...................... | G06Q 20/00 705/35 |
| 9,032,217 B1* | 5/2015 | Brandwine | ............. | G06F 21/44 713/185 |
| 2002/0051541 A1* | 5/2002 | Glick | .................. | H04L 63/0421 380/258 |
| 2007/0050476 A1* | 3/2007 | Etgen | ................ | G06F 17/30893 709/219 |
| 2014/0215082 A1 | 7/2014 | Backholm | | |

(Continued)

FOREIGN PATENT DOCUMENTS

| | | |
|---|---|---|
| EP | 2547066 A1 | 1/2013 |
| EP | 2621146 A1 | 7/2013 |
| WO | 2012178117 A2 | 12/2012 |

OTHER PUBLICATIONS

European Application # 16161141.3 Search Report dated Jul. 18, 2016.

(Continued)

*Primary Examiner* — Philip B Tran
(74) *Attorney, Agent, or Firm* — D.Kligler IP Services Ltd.

(57) ABSTRACT

A method includes intercepting multiple request-response transactions communicated between a server and a client operated by a user. An identification of which of the transactions were generated in a browsing session conducted by the user, and which of the transactions do not belong to any browsing session, is made by evaluating a criterion that depends on a temporal pattern of the transactions.

18 Claims, 3 Drawing Sheets

(56) References Cited

U.S. PATENT DOCUMENTS

2015/0200829 A1* 7/2015 Dubroy .................. H04L 67/22
                                                            709/224
2015/0200861 A1* 7/2015 Lee ........................ H04L 67/02
                                                            709/203
2016/0112440 A1* 4/2016 Kolton .................. G06F 21/567
                                                              726/1

OTHER PUBLICATIONS

Fielding et al., "Hypertext Transfer Protocol—HTTP/1.1", Network Working Group, RFC 2616, 165 pages, Jun. 1999.
3GPP Technical Specification TS 25.401, "3rd Generation Partnership Project;Technical Specification Group Radio Access Network; UTRAN overall description", version 12.0.0, Release 12, 63 pages, Dec. 2013.
3GPP Technical Specification TS 36.300, "Group Radio Access Network; Evolved Universal Terrestrial Radio Access (E-UTRA) and Evolved Universal 10 Terrestrial Radio Access Network (E-UTRAN); Overall description", Stage 2, version 11.7.0, Release 11, 209 pages, Sep. 2013.

* cited by examiner

IDENTIFYING BROWSING SESSIONS BASED ON TEMPORAL TRANSACTION PATTERN

FIELD OF THE INVENTION

The present invention relates generally to communication systems, and particularly to methods and systems for identifying browsing sessions.

BACKGROUND OF THE INVENTION

In various communication systems a user device communicates with a server over a communication network using suitable communication protocols. One protocol that is suitable for request-response communication is the Hypertext Transfer Protocol (HTTP). HTTP is specified, for example, by the Network Working Group of the Internet Engineering Task Force (IETF®), in "Hypertext Transfer Protocol—HTTP/1.1," Request for Comments (RFC) 2616, June, 1999, which is incorporated herein by reference.

SUMMARY OF THE INVENTION

An embodiment that is described herein provides a method including intercepting multiple request-response transactions communicated between a server and a client operated by a user. An identification of which of the transactions were generated in a browsing session conducted by the user, and which of the transactions do not belong to any browsing session, is made by evaluating a criterion that depends on a temporal pattern of the transactions.

In some embodiments, identification of the transactions is performed by analyzing traffic between the client and the server, without sensing interaction between the user and the client. In other embodiments, identifying which of the transactions were generated in the browsing session includes identifying a start time and an end time of the browsing session, and associating with the browsing session only the transactions that start between the identified start time and end time. In yet other embodiments, identifying the start time includes detecting a predefined number of request messages that occur within a predefined time window.

In an embodiment, identifying the start time includes detecting a request message requesting content whose type belongs to a predefined list of one or more content types that are expected to be requested first when a browsing session starts. In another embodiment, identifying the end time includes starting a timeout count when identifying the start time, and defining the end time as an expiry time of the timeout count. In yet another embodiment, identifying the end time includes restarting the timeout count when intercepting another transaction that belongs to the browsing session before the timeout count expires.

In some embodiments, identifying that a given transaction does not belong to any browsing session includes recognizing that the given transaction starts later than a given period threshold relative to the start time. In other embodiments, identifying that a given transaction does not belong to any browsing session includes recognizing that an average data rate of the given transaction is below a given rate threshold. In yet other embodiments, the method includes assigning a higher delivery priority to transactions identified as belonging to the browsing session than to transactions identified as not belonging to any browsing session.

There is additionally provided, in accordance with an embodiment that is described herein, apparatus for traffic management, including an interceptor and a classifier. The interceptor is configured to intercept multiple request-response transactions communicated between a server and a client operated by a user. The classifier is configured to identify which of the transactions were generated in a browsing session conducted by the user and which of the transactions do not belong to any browsing session, by evaluating a criterion that depends on a temporal pattern of the transactions.

The present invention will be more fully understood from the following detailed description of the embodiments thereof, taken together with the drawings in which:

DETAILED DESCRIPTION OF EMBODIMENTS

Overview

In some communication systems, network nodes or servers provide content or services to users over the network. To consume content, the user typically runs a client, such as a Web browser or other application program, on a suitable computer or other user device. The client typically comprises a user interface for interactive operation.

Triggered by user input, the client sends request messages to a server, which is configured to provide the desired content, and the sever responds by sending the requested content items back to the user device. The client may, for example, present the received content to the user on a suitable display of the user device. Based on the type of the received content, the client may first interpret the received content and generate user display accordingly.

In the context of the present disclosure and in the claims, the term "client" refers to any application program that enables a user to access content hosted on a remote server, e.g., a Web browser. In the description that follows, the terms client, application program, Web browser and browser are used interchangeably.

In order to communicate with one another, the client and server typically set up a peer-to-peer communication link, using suitable communication protocols. For example, the client and server may set up a Transmission Control Protocol (TCP) connection for exchanging HTTP messages. The traffic (e.g., packets) exchanged over the peer-to-peer communication link is referred to herein as a flow. For example, a HTTP flow comprises one or more request-response HTTP messages. Some application programs can open multiple TCP connections for managing multiple HTTP flows in parallel.

In the context of the present disclosure and in the claims, a message pair that includes a client request message and a respective server response message is referred to as a request-response transaction, or simply transaction, for brevity. Some transactions are exchanged during, and as part of, browsing sessions of the user. Other transactions are initiated by the client or the server and are not part of a browsing session.

Embodiments that are described herein provide methods and systems for identifying whether a request-response transaction is generated in a browsing session, or not. Such identification can be used, for example, for transferring browsing-related transactions with higher bandwidth and smaller latency, thereby improving the user experience. As another example, download time in certain transactions is an important metric in measuring user experience. The identification of sessions can also be used for reporting purposes.

Consuming content or a service is typically an interactive process in which the application program enables the user to request additional content in response to previously consumed content. For example, in Web browsing, the user may perform, e.g., via a suitable Web browser program, operations such as requesting a Web page, clicking a link for retrieving another Web page, clicking on a presented image to retrieve a multimedia content such as video, image or audio, requesting to download a file and the like. Other application programs such as network games and social network applications are also highly interactive.

A single input from the user to the application program may result in multiple request-response transactions. For example, when a user requests a certain Web page, the Web browser may first retrieve a file that describes the general layout presentation of the Web page (e.g., a HTML file). When the page includes additional content items such as images or other multimedia items, the Web browser automatically generates additional request messages to retrieve the content items that should be presented to the user.

In the context of the present disclosure, a browsing session comprises one or more request-response transactions that are jointly related to a user action. In this sense, transactions that the application program generates automatically, e.g., to retrieve various items of a page for display, should be considered as belonging to the same browsing session. In a browsing session, a given transaction may overlap another transaction, or may be separate in time from all the other transactions. A transaction that is not part of a browsing session may be, for example, a transaction initiated automatically by the client for retrieving updating data such as weather data.

Some application programs may conduct long-duration transactions that consume a very low average bandwidth. Such transactions are also referred to herein as drizzle transactions, update transactions, or background transactions. A drizzle transaction typically comprises multiple request-response pairs of short messages created over a duration that is on the order of several minutes, or more. For example, a weather application may periodically request weather updates from the hosting server (e.g., once every several minutes or more). Drizzle and other background transactions are typically created automatically by certain applications and are not triggered by a user action and should therefore not be identified as belonging to a browsing session. Other examples for drizzle transactions include ads and news updates, in which relevant content is downloaded with the page and is updated periodically during the flow lifetime, typically while the flow remains open.

In the disclosed techniques, a traffic manager intercepts request-response transactions and classifies the transactions as belonging to a browsing session (or not) without explicit information about the user and/or his actions. Methods for distinguishing between request-response transactions that belong to browsing sessions and other request-response transactions are described in detail below.

In some embodiments, the traffic manager intercepts multiple request-response transactions communicated between a server and a client device operated by a user. The traffic manager identifies which of the transactions were generated in a browsing session conducted by the user and which of the transactions do not belong to any browsing session, by evaluating a criterion that depends on a temporal pattern of the transactions. In some embodiments the traffic manager identifies the start time and end time of the browsing session, and associates with the browsing session only transactions that start between the start time and the end time of the browsing session. The traffic manager can detect a transaction start by intercepting the request message of the transaction.

The traffic manager may use any suitable method for determining the start and end times of the browsing session. In one embodiment, the traffic manager recognizes a predefined number of request messages that occur within a predefined time window. For example, the traffic manager can identify a session start time by recognizing a cluster of three transactions whose request messages are intercepted within a predefined time window. In another embodiment, the traffic manager identifies the session start time by recognizing a request message for requesting a content type in a predefined list of one or more content types. The listed content types are expected to be requested first when a browsing session starts. The list may comprise, for example, Hypertext Markup Language (HTML), HTM, Cascading Style Sheets (CSS) and/or JavaScript.

In some embodiment, the traffic manager starts a timeout count when identifying the start time of the session, and recognizes the session end time when the timeout count expires. In an embodiment, the traffic manager restarts the timeout count when detecting that another transaction starts before the timeout count expires, thus extending the browsing session.

In some embodiments, the traffic manager identifies that a given transaction does not belong to the browsing session by recognizing that the transaction starts later than a given period threshold relative to the session start time. In other embodiments, the traffic manager measures the average data rate of the data delivered by a given transaction, and identifies that the given transaction does not belong to the browsing session when the measured data rate is below a given rate threshold (i.e., a background updating session).

The traffic manager may apply any suitable method to handle transactions that are identified as belonging to a browsing session. In an example embodiment, the traffic manager assigns a higher delivery priority to transactions identified as belonging to the browsing session than to transactions identified as not belonging to the browsing session. For example, in a mobile communication system the traffic manager assigns these delivery priorities separately in different cells. Alternatively or additionally, the transaction identification may be used for reporting purposes.

In the disclosed techniques, the identification of a given transaction as belonging (or not) to a browsing session is based on analyzing the temporal pattern of multiple transactions in the traffic flow, without using explicit knowledge of the identity or actions of the user, server, or both. The disclosed identification techniques can thus be implemented with low complexity and low processing delay.

System Description

Figure 1:
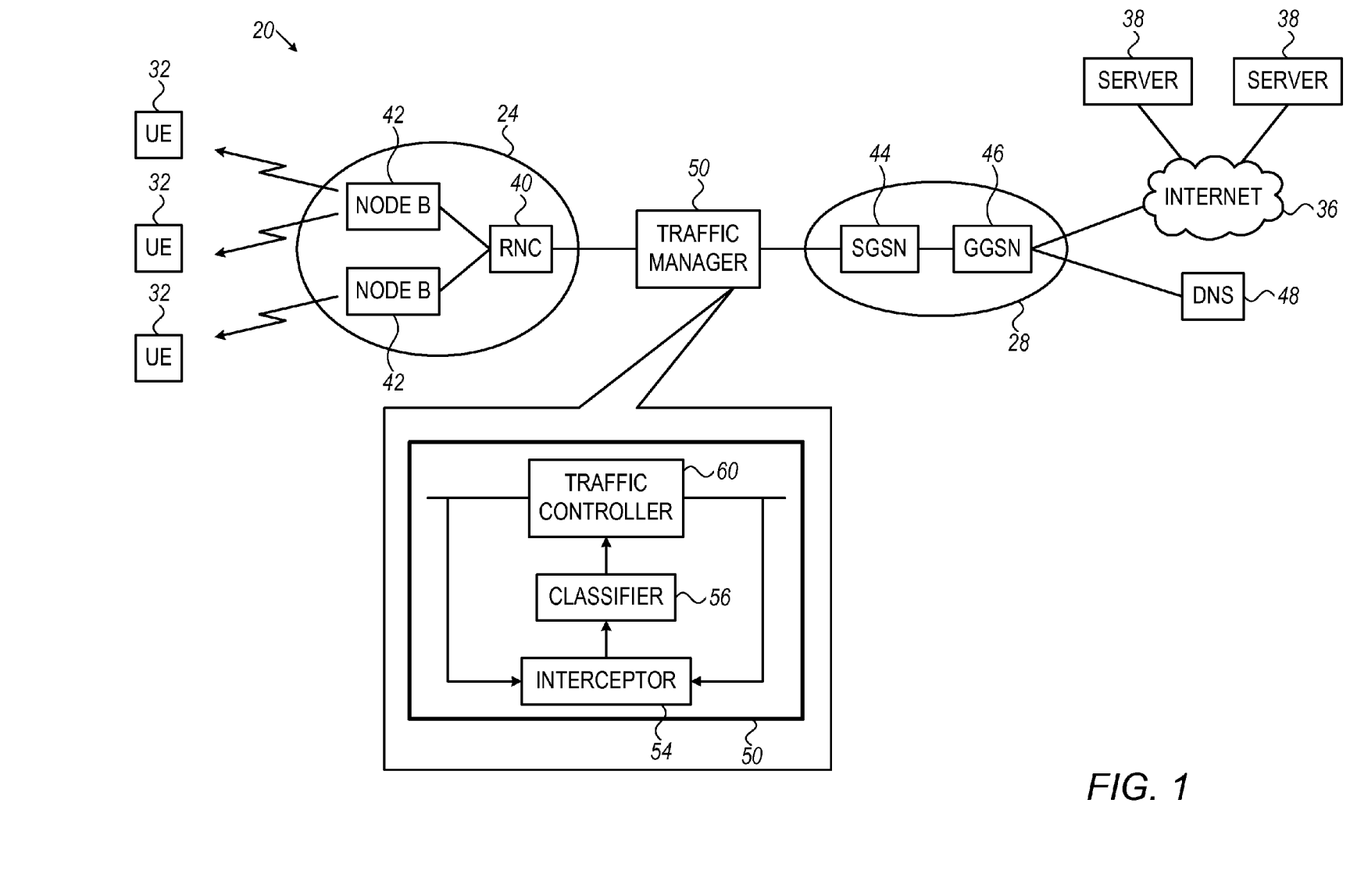
FIG. 1 is a block diagram that schematically illustrates a communication system including a traffic manager, in accordance with an embodiment that is described herein.

FIG. 1 is a block diagram that schematically illustrates a communication system 20 including a traffic manager 50, in accordance with an embodiment that is described herein. System 20 may comprise any suitable communication network, such as, for example, a wireless network, a terrestrial network, or a combination of wireless and terrestrial networks. Additionally, system 20 may deliver traffic across the network, using any suitable interfaces and related protocols, and at any suitable data rates.

In the present example, communication system 20 comprises a mobile communication network, in which a Radio Access Network (RAN) 24, together with a Core Network (CN) 28, enable multiple mobile terminals 32 to access various services over the network. The services may originate in, or delivered via a land part of the network, such as, for example, a local or a wide area network (WAN/LAN), or Internet network 36. Servers 38 that are accessible over Internet network 36 may provide various services to terminals 32, such as, for example, Web browsing and giving access to multimedia and other content.

In the example of FIG. 1, communication system 20 comprises a 3GPP Universal Mobile Telecommunications System (UMTS). In UMTS, RAN 24 is part of an Access Network (AN), which is also referred to as Universal Terrestrial Radio Access Network (UTRAN). UTRAN is described, for example, in 3GPP Technical Specification TS 25.401, entitled "3rd Generation Partnership Project; Technical Specification Group Radio Access Network; UTRAN overall description," (3GPP TS 25.401, version 12.0.0, Release 12), December 2013, which is incorporated herein by reference.

RAN 24 comprises a Radio Network Controller (RNC) 40, which provides control functionalities to one or more Base Stations (BSs) 42, also referred to as Node Bs. The functionalities of RNC 40 and Node B 42 can be implemented on the same device, or can be implemented on physically separated devices.

Alternatively, communication system 20 may comprise a Long Term Evolution (LTE) network, in which RAN 24 comprises an Evolved Universal Terrestrial Radio Access Network (E-UTRAN), in which BSs 42 comprise an eNodeB device that typically includes the control functionalities of RNC 40. E-UTRA is described, for example, in 3GPP Technical Specification TS 36.300, entitled "Group Radio Access Network; Evolved Universal Terrestrial Radio Access (E-UTRA) and Evolved Universal Terrestrial Radio Access Network (E-UTRAN); Overall description," (3GPP TS 36.300, version 11.7.0, Release 11), September, 2013, which is incorporated herein by reference.

Mobile terminal 32, which is also referred to in UMTS and LTE networks as a User Equipment (UE), may comprise any wireless device, such as, for example, a hand-held telephone, a laptop computer equipped with a mobile broadband adapter, a wireless-enabled mobile computing device, or any other suitable type of wireless communication terminal.

Network data services are sometimes provided using a General packet radio service (GPRS) protocol. GPRS is a 2.5G and 3G mobile communications technology that enables mobile network operators to offer their mobile subscribers packet-based data services, such as access to the Internet, over GSM (and other) networks. A GPRS core network provides, among other tasks, mobility management, session management and transport for Internet Protocol (IP) packet services in various networks, such as, for example, GSM and WCDMA networks. In the example of communication system 20, CN 28 comprises a GPRS/UMTS core network that comprises a Serving GPRS Support Node (SGSN) 44, and a Gateway GPRS Support Node (GGSN) 46.

SGSN 44 is typically responsible for the delivery of data packets from and to BSs 42 within the geographical service area of the SGSN. Among other tasks, SGSN 44 performs packet routing and transfer, mobility management, as well as authentication and charging functions. SGSN 44 stores location information (e.g., current serving cell and roaming information) of the GPRS users that are registered with the SGSN.

GGSN 46 is responsible for the interconnection between CN 28 and external packet switched networks, such as Internet network 36. When receiving packet data destined to a given UE 32, GGSN 46 forwards the data to the SGSN that is serving the given UE. In the opposite direction, GGSN 46 routs mobile-originated packets to a respective destination in the network. GGSN 46 converts the GPRS packets coming from SGSN 44 into the appropriate packet data protocol (PDP) format (e.g., IP or X.25) and sends the packet data out on the corresponding packet data network.

Communication system 20 further comprises a Domain Name System (DNS) 48, which translates domain names into respective IP addresses. When initiating a communication session with a host, e.g., to request a certain service, UE 32 typically first sends the domain name of the host to DNS 48, which responds by sending the corresponding IP address of the host back to the UE. The UE then uses the IP address to set up a communication session with the host. Terminal 32 may communicate with the serving host using, for example, a request-response protocol, such as, for example, the HTTP cited above.

A traffic manager 50 interconnects between RNC 40 and SGSN 44. The traffic manager intercepts messages exchanged across the network. In some embodiments, traffic manager 50 intercepts HTTP request-response transactions and identifies which of the transactions belong to browsing sessions. In an embodiment, traffic manager 50 comprises an interceptor 54 and a traffic controller 60. Interceptor 54 intercepts HTTP request-response transactions, and uses temporal information among multiple transactions to identify which of the transactions belong to a browsing session. Traffic manager 50 typically identifies the transactions separately and independently for different UEs 32. Methods for identifying transactions as belonging, or not, to browsing sessions are described in detail below.

In some embodiments, traffic controller 60 may control the delivery data rate per individual transaction or per a group of transactions. In some embodiments, traffic controller 60 gives higher priority to certain flows that are communicated via the same cell or BS. The flows may be associated with one or more UEs 32. In an embodiment, to improve the user experience during browsing, traffic controller 60 assigns higher priority to transactions that interceptor 54 identifies as belonging to browsing sessions than to other transactions. The delivery priority rules are configurable and may be changed manually or adaptively based on network conditions. Alternatively or additionally, the traffic controller may assign to the transactions identified as belonging to browsing sessions higher bandwidth or Quality of Service (Qos), or any other suitable enhanced attribute that may improve the user experience while browsing.

The network configuration system 20 in FIG. 1 is an example configuration, which is chosen purely for the sake of conceptual clarity. In alternative embodiments, any other suitable configuration can also be used. For example, the network configuration in FIG. 1 comprises single RNC and SGSN units. In practical UMTS networks, however, the functionalities of the RNC and GGSN units may be distributed over multiple such units. Thus, the GGSN may communicate with multiple SGSNs, and each SGSN may communicate with multiple RNCs.

The functionality of traffic manager 50 can be implemented in a separate module or split among multiple modules. For example, the traffic manager can be implemented within SGSN 44 or RNC 40. Alternatively, traffic manager 50 can reside between RNC 40 and BS 42. Further alternatively, the functionality of traffic manager can be implemented as part of BS 42.

The configuration of traffic manager 50 in FIG. 1 is an example configuration, which is chosen purely for the sake of conceptual clarity. In alternative embodiments, any other suitable configuration can also be used. For example, although in the description above, the traffic manager comprises a traffic controller, e.g., for controlling the delivery rate based on the classifier decisions, in alternative embodiments, the classifier decisions ore provided to a system outside the traffic manager, e.g., a system of the system provider, for further processing.

The different elements of traffic manager 50 may be implemented using any suitable hardware, such as in an Application-Specific Integrated Circuit (ASIC) or Field-Programmable Gate Array (FPGA). In some embodiments, some elements of traffic manager 50 can be implemented using software, or using a combination of hardware and software elements.

Typically, traffic manager 50 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Identifying HTTP Transactions

Figure 2:
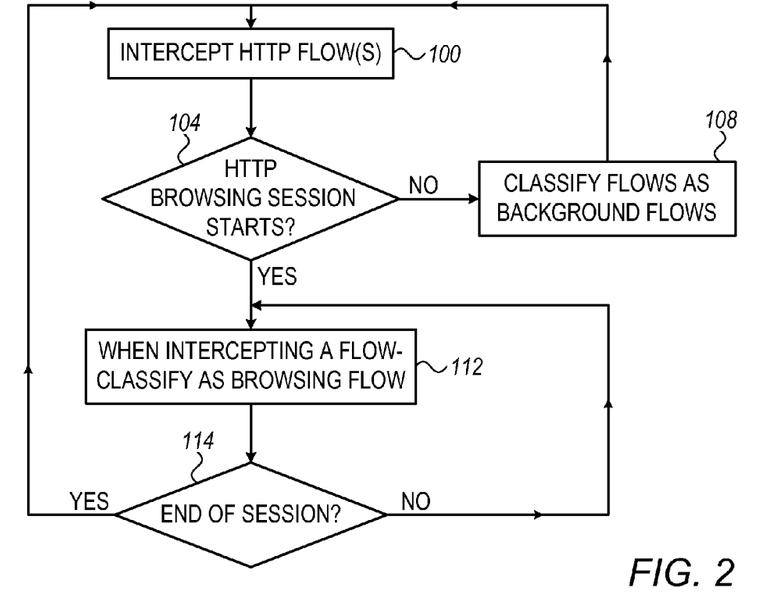
FIG. 2 is a flow chart that schematically illustrates a method for classifying HTTP transactions, in accordance with an embodiment that is described herein.

FIG. 2 is a flow chart that schematically illustrates a method for classifying HTTP transactions, in accordance with an embodiment that is described herein. The method of FIG. 2 can be executed, for example, by traffic manager 50 of FIG. 1 above. The method begins with interceptor 54 intercepting one or more HTTP flows, at an interception step 100. At a start checking step 104, classifier 56 checks whether the HTTP flows intercepted at step 100 fulfill a criterion that identifies a HTTP browsing session start event. Classifier 56 may use any suitable method and criterion for identifying the start time of a HTTP browsing session. Example such methods are described in FIG. 3, below.

When at step 104 classifier 56 does not detect that a HTTP browsing session has started, the classifier identifies the HTTP flow(s) intercepted at step 100 as background flows at a background identification step 108, and loops back to step 100 to intercept subsequent HTTP flows. Otherwise, classifier 56 detects that a HTTP browsing session has just started and proceeds to an identification step 112, in which classifier 56 identifies the HTTP flows intercepted at step 100 as belonging to a browsing session. Further at step 112, interceptor 54 may intercept additional HTTP flows, which classifier 56 classifies as belonging to the browsing session.

At a session termination checking step 114, classifier 56 checks whether the current browsing session has ended. In an example embodiment, classifier 56 uses a timeout count to detect a HTTP browsing session end time. Classifier 56 starts the timeout count at step 104 when the browsing session starts, and restarts the timeout count at step 112, when detecting an additional HTTP flow that belongs to the current HTTP browsing session.

In an embodiment, at step 112, classifier 56 identifies as belonging to the current browsing session only HTTP flows that have no unique classification type such as, for example, HTTP flows that carry video or audio content, or high volume transactions with Web sites such as Youtube, Instagram and Netflix. For other HTTP flows that have a unique classification type, the classifier does not restart the timeout count.

At step 114, the expiration of the timeout count signals to classifier 56 that the current browsing session has ended and the method loops back to step 100 to intercept subsequent HTTP flows. When at step 114 the timeout has not yet expired, the method loops back to step 112 to intercept additional HTTP flows (if any) that belong to the current HTTP session. Alternatively or additionally, classifier 56 detects that the HTTP session has ended when a predefined time period has elapsed since the session start time. Further alternatively or additionally, classifier 56 can use any other suitable method for detecting that the HTTP session has ended.

In some embodiments, classifier 56 further classifies the HTTP flows intercepted at steps 100, 112, or both into sub-types. For example, classifier 56 determines the sub-type classification based on content-type information embedded in the HTTP flow messages, such as, for example, video, audio, or image sub-type.

In an embodiment, classifier 56 identifies a HTTP flow that carries an image content as belonging to the current browsing session when intercepted during the HTTP browsing session (e.g., at step 112 above), and as a background image flow when intercepted outside any HTTP session (e.g., at step 108 above).

Classifier 56 does not associate with a given browsing session any HTTP flow that is intercepted subsequently to the detection of the browsing session end time. Note however, that one or more of the HTTP flows that belong to the already ended browsing session may still exchange data between the user device and the server. For example, the server may continue to send the remaining of a large file to the user.

In some embodiments, an application program at the user device may automatically generate request-response transactions, e.g., for updating purposes. Typically, such transactions comprise short messages that occur far apart from one another on the time axis and therefore consume very low average bandwidth. In an embodiment, at step 108, classifier 56 identifies a HTTP flow that consumes an average data rate lower than a predefined rate threshold as a background updating HTTP flow and not as generated in a browsing session. In an embodiment, the rate threshold is on the order of 20 Kbits per second or about one or two packets per second. Classifier 56 may measure the average data rate over a given time window, such as, for example, two seconds.

Figure 3:
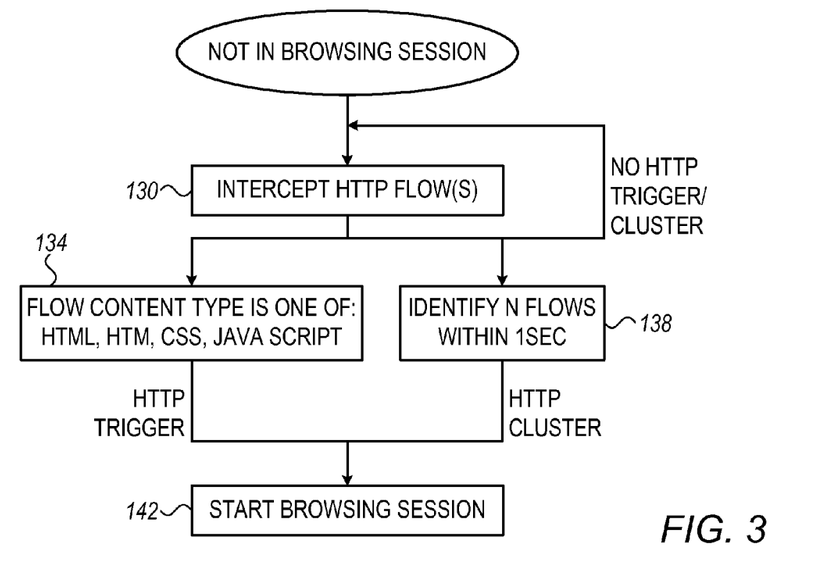
FIG. 3 is a flow chart that schematically illustrates a method for identifying the starting point of a HTTP browsing session, in accordance with an embodiment that is described herein.

FIG. 3 is a flow chart that schematically illustrates a method for identifying the starting point of a HTTP browsing session, in accordance with an embodiment that is described herein. The method of FIG. 3 can be used, for example, in implementing steps 100 and 104 of the method described in FIG. 2 above. We assume that prior to executing the method of FIG. 3 traffic manager 50 has not yet detected the start time of a browsing session.

In the method of FIG. 3 one criterion for identifying the browsing session start time relies on the observation that when a user initiates a browsing session, the underlying Web browser or application program typically generates a large number of transactions (possibly using separate TCP connections) that start within a short period of time. Therefore, intercepting several HTTP flows within a given time window may indicate the starting of user-initiated browsing session with high probability. This criterion is also referred to herein as a cluster criterion.

Another criterion for identifying the starting of a browsing session relies on the observation that user-initiated browsing sessions typically first request content of certain types such as, for example, Hypertext Markup Language (HTML), HTM, Cascading Style Sheet (CSS) and JavaScript. Alternatively or additionally, other content types can also be used. Thus, intercepting content of the above-mentioned types can be used to indicate that a browsing session has started. This criterion is also referred to herein as a trigger criterion.

The method of FIG. 3 begins by interceptor 54 intercepting one or more HTTP flows at a flow interception step 140 (similarly to step 100 of FIG. 2 above). At a trigger evaluating step 134, classifier 56 identifies that a browsing session has started when the trigger criterion described above is fulfilled.

At a cluster evaluating step 138, classifiers 56 checks whether the number of intercepted flows that start within a given time window exceeds a threshold number (i.e., the cluster criterion described above). For example, classifier 56 may identify that a browsing session has started when at least three flows start within a one-second time window. In alternative embodiments, any other suitable threshold number and time window can also be used. After detecting the browsing start at step 134 or 138, the method proceeds to step 142, in which classifier 56 starts a timeout count as described above.

When at step 134 or 138 classifier 56 does not identify that a browsing session has started, the method loops back to step 130 to intercept subsequent HTTP flows.

The methods described in FIGS. 2 and 3 are example methods, and other suitable methods can also be used. Although the methods described in FIGS. 2 and 3 refer mainly to HTTP, these methods apply to HTTP Secure (HTTPS) sessions, or other suitable secured sessions, as well. In some HTTPS sessions the traffic is encrypted and possibly includes certification information. Since HTTPS sessions create transaction patterns that are similar to those created by HTTP sessions, the traffic manager can identify the HTTPS transactions as described above, even though the data is encrypted.

In an embodiment, at step 138 of FIG. 3 above, classifier 56 detects a transaction (or flow) start, for example, when intercepting the request message part of the transaction. In another embodiment, classifier 56 detects the transaction start when the underlying TCP connection is set up. In alternative embodiments, classifier 56 can use any other suitable method for detecting when a transaction of flow starts.

Example HTTP Browsing Sessions

Figure 4:
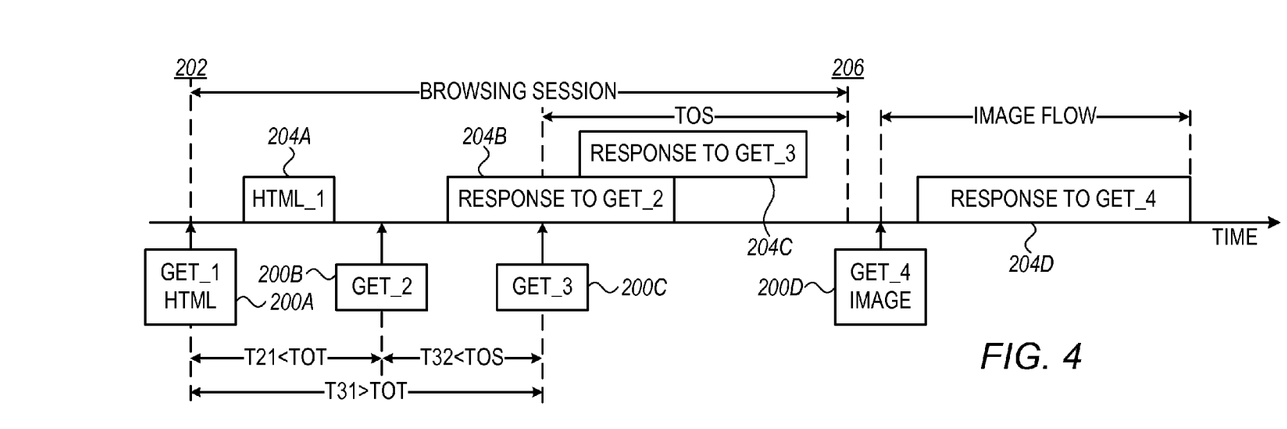
FIGS. 4 and 5 are diagrams that schematically illustrate examples of classifying HTTP transactions, in accordance with embodiments that are described herein.
Figure 5:
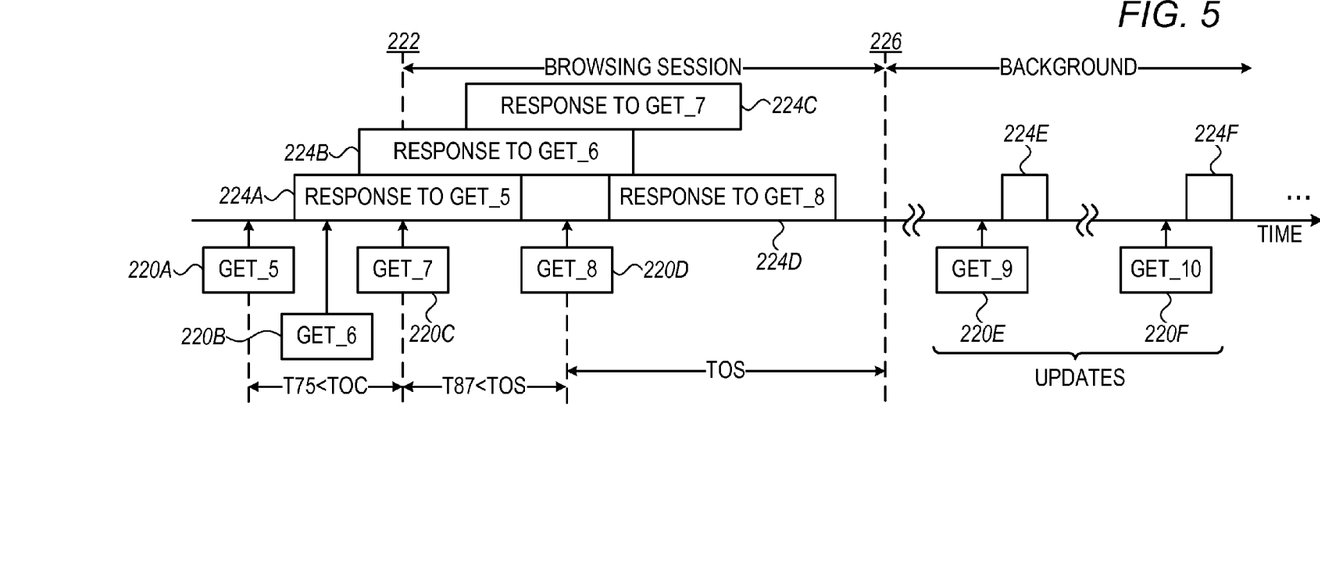

FIGS. 4 and 5 are diagrams that schematically illustrate examples of classifying HTTP transactions, in accordance with embodiments that are described herein. FIGS. 4 and 5 depict multiple HTTP transactions each starting with a GET (request) message that is followed by a respective response message.

In the examples of FIGS. 4 and 5, we assume that a traffic manager and methods similar to those described in FIGS. 1-3 above are used for transaction identification. In FIGS. 4 and 5, TOS denotes a timeout count that classifier 56 of traffic manager 50 starts at browsing session start, and restarts when intercepting another transaction that belongs to the browsing session.

In the example of FIG. 4 we assume that the user initiates a browsing session by inputting at the Web browser a Uniform Resource Locator (URL) of a desired Web page. As a result, the Web browser sends a respective request message GET_1, to retrieve the respective HTML file from the server, which response by sending back message HTML_1. The Web browser analyzes the received HTML file, which indicates that two additional content items should be retrieved. The Web browser then sends request messages GET_2 and GET_3, which the server responds to by sending back respond messages 204B and 204C. A while later the user clicks on an image link of the Web page, which triggers the Web browser to send GET_4 message, and the server to respond with respond message 204D that includes the requested image file.

The first request message GET_1 requests a HTML file, and therefore, in accordance with the trigger criterion described above, classifier 56 decides that a browsing session has started when intercepting message GET_1 at a time point marked by line 202. In the figure, TOT denotes a time window relative to the session start time 202 that was detected in accordance with the trigger criterion. Since GET_2 occurs within the TOT window, classifier 56 includes the transaction starting with message GET_2 in the current browsing session.

Classifier 56 also identifies the transaction starting with message GET_3 as belonging to the current browsing session since the timeout count TOS that was restarted when intercepting message GET_2 has not yet expired when GET_3 was intercepted. Classifier 56 decides that the browsing session has ended at a time point indicated by line 206, i.e., when TOS expires after restarted when message GET_3 was intercepted.

Classifier 56 identifies the transaction starting with GET_4 message as not belonging to the browsing session that has ended at the time indicated by line 206. Since this transaction has an image content-type, classifier 56 identifies this transaction as an image flow. In some embodiments, image flows get higher delivery priority than non-image background transactions.

In the example of FIG. 5, request messages are numbered 220A . . . 220F, and are denoted GET_5 . . . GET_10, respectively, and the respective response messages are numbered 224A . . . 224F. In this example, the user initiates a browsing session, which results in a sequence of request messages GET_5, GET_6, GET_7 and GET_8.

Let TOC denote the timeout count for detecting a session start by the cluster criterion described above. Since the three requests GET_5 . . . GET_7 fall within the TOC time window, classifier 56 decides that a browsing session has started at a time point indicated by line 222. The request GET_8 occurs within TOS period relative to request message GET_7, and therefore classifier 56 identifies the transaction starting with request message GET_8 as belonging to the current browsing session. Classifier 56 decides that the browsing session ends when the TOS timeout count that was restarted when message GET_8 was intercepted expires, at a time point indicated by line 226.

In the present example, after the browsing session ends, the application program automatically generates periodic updating request messages including messages GET_9 and GET_10, which are several minutes apart from one another.

The respective responses are denoted 214E and 214F and comprise short massages that carry updating information. Since these transactions occur outside the browsing session and consume a very low average bandwidth, classifier 56 identifies these transactions as drizzle flows.

The HTTP browsing sessions depicted in FIGS. 4 and 5 are given by way of example and other suitable browsing sessions can also be presented. For example, any transaction that is not classified according to the trigger criterion (transactions other than, for example, HTML and CSS) or transactions that have a unique classification type such as Youtube, and that start outside the TOT period, are also classified as background transactions.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    intercepting messages of multiple request-response transactions communicated between a server and clients operated by users;
    initializing a state indicator to not-in-a-browsing-session, for each client having intercepted messages;
    repeatedly determining whether one or more recently intercepted messages meet a predefined first condition of a start time of a browsing session, and if the one or more recently intercepted messages meet the predefined first condition, setting the state indicator for the corresponding client to in-a-browsing-session;
    setting the state indicator of a client to not-in-a-browsing-session, when a predefined second condition is met for the client; and
    classifying the intercepted messages as belonging to a user-conducted browsing session if the message is intercepted when the state indicator of its corresponding client is in-a-browsing-session, and classifying the intercepted message as not belonging to any user-conducted browsing session, if the message is intercepted when the state indicator is not-in-a-browsing-session.

2. The method according to claim 1, wherein classifying of the intercepted messages is performed by analyzing traffic between the client and the server, without sensing interaction between the user and the client.

3. The method according to claim 1, wherein determining whether one or more recently intercepted messages meet the predefined first condition comprises detecting a cluster of at least a predefined number of request messages that occur within a predefined time window.

4. The method according to claim 1, wherein determining whether one or more recently intercepted messages meet the predefined first condition comprises detecting a request message requesting content whose type belongs to a predefined list of one or more content types that are expected to be requested first when a browsing session starts.

5. The method according to claim 1, wherein setting the state indicator to not-in-a-browsing-session, when a second predefined condition is met comprises starting a timeout count when identifying the start time, and setting the state indicator to not-in-a-browsing-session a predetermined time after a last time in which the recently intercepted messages were determined to meet the predefined first condition.

6. The method according to claim 5, comprising restarting the timeout count when intercepting another transaction that belongs to the browsing session before the timeout count expires.

7. The method according to claim 1, wherein setting the state indicator to not-in-a-browsing-session, when a second predefined condition is met comprises setting the state indicator for a given client to not-in-a-browsing-session when recognizing that an average data rate of data delivered to the client is below a given rate threshold.

8. The method according to claim 1, and comprising assigning a higher delivery priority to transactions identified as belonging to the user-conducted browsing sessions than to transactions identified as not belonging to any user-conducted browsing sessions.

9. The method according to claim 1, wherein intercepting the messages comprises intercepting by a unit located between a radio access network and a core network.

10. The method according to claim 1, wherein intercepting the messages comprises intercepting by a unit located within a radio access network.

11. Apparatus for traffic management, comprising:
    one or more interfaces configured to intercept messages of multiple request-response transactions communicated between a server and clients operated by users; and
    a computer, which is configured to:
        initialize a state indicator to not-in-a-browsing-session, for each client for which messages were intercepted,
        repeatedly determine whether one or more recently intercepted messages meet a predefined first condition of a start time of a browsing session, and if the one or more recently intercepted messages meet the predefined first condition,
        set the state indicator for the corresponding client to in-a-browsing-session, to set the state indicator of a client to not-in-a-browsing-session, when a predefined second condition is met for the client and
        classify the intercepted messages as belonging to a user-conducted browsing session if the message is intercepted when the state indicator of its corresponding client is in-a-browsing-session, and to classify the intercepted message as not belonging to any user-conducted browsing session, if the message is intercepted when the state indicator is not-in-a-browsing-session.

12. The apparatus according to claim 11, wherein the computer is configured to classify the intercepted messages by analyzing traffic between the client and the server, without sensing interaction between the user and the client.

13. The apparatus according to claim 11, wherein the computer is configured to set the state indicator for the corresponding client to in-a-browsing-session, upon detecting a cluster of at least a predefined number of request messages that occur within a predefined time window.

14. The apparatus according to claim 11, wherein the computer is configured to set the state indicator for the corresponding client to in-a-browsing-session, upon detecting a request message requesting content whose type belongs to a predefined list of one or more content types that are expected to be requested first when a browsing session starts.

15. The apparatus according to claim 11, wherein the computer is configured to start a timeout count when identifying the start time, and to set the state indicator to not-in-a-browsing-session a predetermined time after a last time in which the recently intercepted messages were determined to meet the predefined first condition.

16. The apparatus according to claim 15, wherein the computer is configured to restart the timeout count when intercepting another transaction that belongs to the browsing session before the timeout count expires.

17. The apparatus according to claim 11, wherein the computer is configured to set the state indicator for a given client to not-in-a-browsing-session when recognizing that an average data rate of data delivered to the client is below a given rate threshold.

18. The apparatus according to claim 11, and comprising a traffic controller, which is coupled to the computer and is configured to assign a higher delivery priority to transactions identified as belonging to the user-conducted browsing session than to transactions identified as not belonging to any user-conducted browsing session.

* * * * *